United States Patent

Bays

[15] 3,695,067
[45] Oct. 3, 1972

[54] CAR THEFT PREVENTION DEVICE

[72] Inventor: Robert D. Bays, 3518 Stevely Ave., Long Beach, Calif. 90808

[22] Filed: June 29, 1970

[21] Appl. No.: 50,541

[52] U.S. Cl. ............................70/63, 70/14, 70/53
[51] Int. Cl. ......F05b 65/52, F05b 73/00, B65d 55/14
[58] Field of Search........70/14, 38 C, 20, 51, 52, 57, 70/63, 53, 447, 25, 180, 203, 212, 200; 109/23, 51, 52; 248/340

[56] References Cited

UNITED STATES PATENTS

| 1,955,809 | 4/1934 | Hobbs | 70/63 |
| 2,813,620 | 11/1957 | Hansen | 70/63 |
| 2,911,814 | 11/1959 | Williams | 70/14 |
| 3,084,532 | 4/1963 | Williams | 70/63 |
| 3,236,075 | 2/1966 | Williams | 70/63 |
| 3,436,937 | 4/1969 | Barrett | 70/63 |
| 1,227,826 | 5/1917 | Raff | 70/25 |

Primary Examiner—George F. Mautz
Assistant Examiner—Edward J. McCarthy
Attorney—Fulwider, Patton, Rieber, Lee & Utecht

[57] ABSTRACT

A car theft prevention device for locking a car key to the exterior door handle of a car so a number of authorized persons may have access thereto. The device includes a housing formed with an open chamber for receiving the key and including shackle-receiving means. A cover is provided for securement to the housing to close the chamber.

5 Claims, 5 Drawing Figures

PATENTED OCT 3 1972
3,695,067
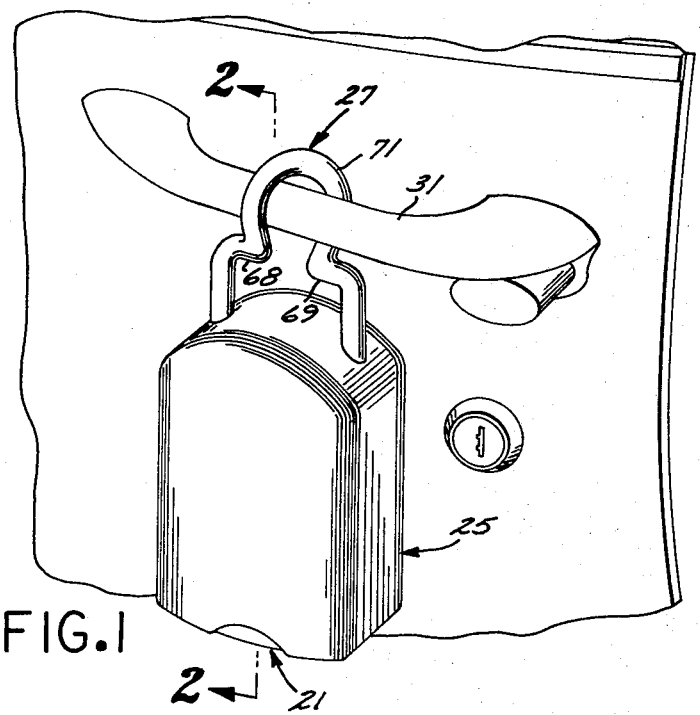
FIG.1
FIG.2
FIG.3
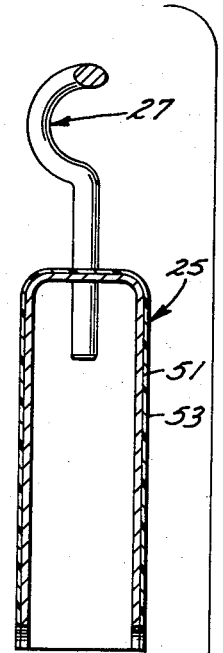
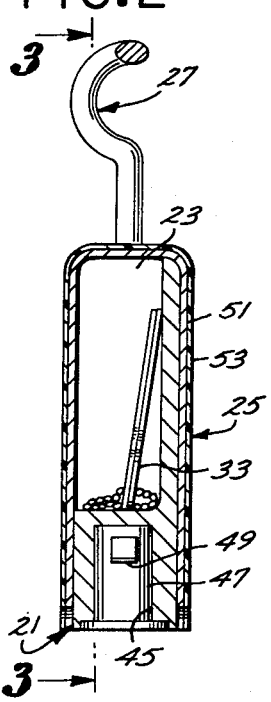
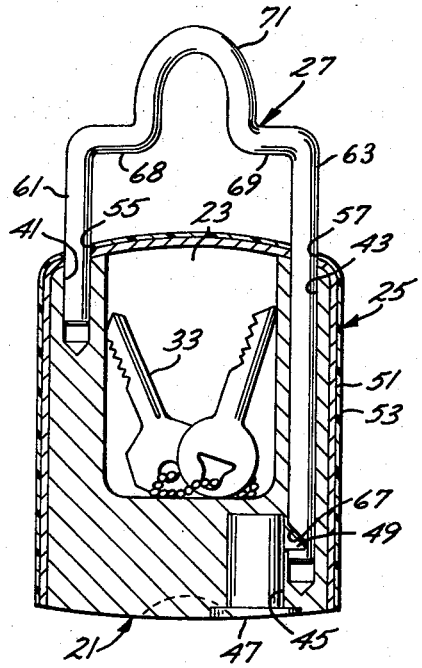
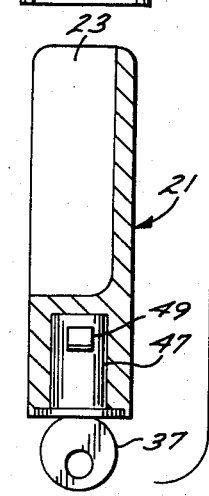
FIG.4
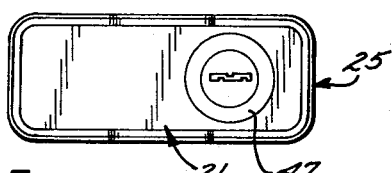
FIG.5
INVENTOR.
ROBERT D. BAYS
BY Fulwider, Patton, Rieber,
Lee and Utecht
ATTORNEYS

CAR THEFT PREVENTION DEVICE

BACKGROUND OF THE INVENTION

1. Field of the Invention

The present invention relates to a device for locking car keys to a car for access thereto by a number of authorized persons, such as car salesmen.

2. Description of the Prior Art

It has been common practice to leave the keys in automobiles being displayed for sale so each of the salesmen showing such cars may have ready access thereto for starting the car and demonstrating it to prospective customers. However, presence of the ignition keys in the automobiles leads to numerous automobile thefts by persons taking advantage of the keys being left in the ignition.

Customized locking devices have been proposed for locking extra keys to an owner's car as disclosed in U.S. Pat. No. 1,916,890. However, there are no car theft prevention devices known to applicant which include a housing having a shackle connected thereto for convenient receipt over the door handles of different cars whereby such device may be used on any one of a number of different cars.

SUMMARY OF THE INVENTION

The car theft prevention device of present invention is characterized by a housing formed with a key-receiving chamber and having a removable cover disposed thereover. A shackle is provided and is formed with a loop for connection over the exterior door handle of a car. Locking means is provided for locking the cover to the housing and for locking both the housing and the cover to the shackle whereby the automobile key may be stored in the key-receiving chamber and the entire device attached to a car door handle so different authorized personnel may have access to the car key.

An object of the present invention is to provide a car theft prevention device of the type disclosed which may be opened by any one of a number of authorized personnel.

Another object of the present invention is to provide a car theft prevention device of the type disclosed which is interchangeable from one car to another.

A still further object of the present invention is to provide a car theft prevention device of the type described which is economical to manufacture and convenient to operate.

These and other objects and the advantages of the present invention will become apparent from a consideration of the following detailed description when taken in conjunction with the accompanying drawing.

DESCRIPTION OF THE DRAWING

FIG. 1 is a perspective view of a car theft prevention device embodying the present invention;

FIG. 2 is a vertical sectional view taken along the line 2—2 of FIG. 1;

FIG. 3 is a vertical sectional view taken along the line 3—3 of FIG. 2;

FIG. 4 is a vertical sectional view similar to FIG. 2 and showing the car theft prevention device in its open condition; and FIG. 5 is a bottom view of the car theft prevention device shown in FIG. 1.

DESCRIPTION OF THE PREFERRED EMBODIMENT

Referring to FIGS. 2 and 3, the car theft prevention device of present invention includes a housing, generally designated 21, formed with a key-receiving chamber 23 which is open on its top and front sides. A downwardly opening cover, generally designated 25, is telescoped downwardly over the housing 21 and a bale 27 is provided for being hooked over a door handle 31 and locked to the housing 21 whereby the car keys 33 may be placed in the chamber 23, the cover 25 telescoped over such housing 21 and the bale 27 hooked over the door handle 31 and locked in position to retain the keys 33 on the car whereby a salesman having a master key 37 will have convenient access thereto while preventing unauthorized persons from starting the car and driving it away.

The body 21 is rectangularly shaped in horizontal cross section and is preferably made of hardened steel and is formed with a pair of downwardly projecting, leg-receiving bores 41 and 43 disposed on opposite sides of the chamber 23 and lying in the same plane. An upwardly projecting bore 45 is formed in the lower extremity of the body 21 for receipt of a lock cylinder 47 having a locking bolt 49 selectively projectable from the side thereof.

The cover 25 includes a tough casing 51 which is preferably made from a zinc alloy sold under the trade name "Zamak" by Morris P. Clark of Los Angeles, Calif. The casing 51 is coated with a fluorescent plastic 53 which may be bright orange in color for ready identification by law enforcement personnel so they will be put on notice that a car having the car theft prevention device of present invention hanging from the door thereof is being operated by an unauthorized driver.

The cover 25 is open on its bottom extremity for being conveniently telescoped over the housing 21 and has a pair of bores 55 and 57 formed in its top wall and disposed in alignment with the leg-receiving bores 41 and 43 in the housing 21 for receipt of the shackle 27.

The shackle 27 is generally U-shaped and formed with a pair of downwardly projecting legs 61 and 63 which are telescopically insertable into the respective bores 41 and 43. The lower extremity of the leg 63 is formed with a side opening latching notch 67 for receipt of the latching bolt 49 projecting from the lock cylinder 47.

The upper extremity of the shackle 27 is turned inwardly to form downwardly facing shoulders 68 and 69 and then projects upwardly and is turned back on itself to form an arcuate loop 71 which is twisted to extend generally transversely of the general plane of the shackle itself whereby such shackle may be received over the handle 31 to carry the body of the device extending generally parallel to the side of the automobile.

In operation, a car theft prevention device may be provided for each automobile parked on a show lot and each salesman may be provided with a master key 37. Each car theft prevention device will have the keys 33 of the particular automobile stored in the chamber 23 and the cover 25 will be telescoped over the body 21. The shackle 27 will then be inserted over the exterior door handle 31 by fitting the legs 61 and 63 thereover and then rotating the shackle a half turn to accommodate the handle 31 in the twist of the loop 71 and then inserting such legs through the cover bores 55 and 57 and into the respective bores 41 and 43 in the body 21. The locking leg 63 will be inserted sufficiently far into the bore 43 to engage the upper beveled surface of the locking bolt 49 to retract such bolt and maintain it retracted until the notch 67 registers therewith, at which time such bolt will project into the notch to lock the shackle 27 in position. The device will then remain suspended from the handle 31 with the cover 25 and body projecting parallel to the side of the car.

Any unauthorized person attempting to gain access to the key 33 will have their efforts thwarted since the cover 25 can only be raised on the body 21 until the top thereof engages the in-turned portions defining the shoulders 68 and 69. Further, even if the automobile is hot wired, and the car theft prevention device is left hanging from the exterior door handle 31, the fluorescent plastic coating 53 will provide notice to law enforcement personnel that such automobile is being operated by an unauthorized driver. Additionally, any attempts made to remove the car theft prevention device will be futile since the shackle 27 is made of case hardened steel and the cover 25 is made of Zamak, thereby making conventional hacksaws and bolt cutters ineffective in removal attempts.

When any one of the automobile salesmen wish to show a car, he can insert his master key 37 into the lock cylinder 47 and rotate the tumblers to retract the lock bolt 49 to release the housing 21 from the shackle 27. The housing 21 may then be telescoped downwardly on the shackle legs 61 and 63 and the cover 25 raised on such housing sufficiently to gain access to the key 33 through the open side of the chamber 23 while maintaining the longer leg 63 engaged with the passage 43. If desirable, the entire device may be removed from the handle 31 by holding the cover 25 down on the housing 21 while the shackle is raised sufficiently to cause the lower extremity of the leg 61 to clear the top of the cover 25 by an amount to allow for passage therebetween of the handle 31. The cover 25 may then be removed from the housing 21 to gain access to the key 33 for starting the car engine. After the car has been shown, to the customer the keys 33 may be placed back in the chamber 23, the cover inserted on the housing 21 and the shackle hooked over the door handle 31 and locked to the housing 21.

From the foregoing it will be apparent that the car theft prevention device provides a highly effective and convenient means for storing keys to a car for convenient access thereto by any one of a number of different authorized individuals while preventing theft of such car by unauthorized individuals coming onto a car lot.

Various modifications and changes may be made with regard to the foregoing detailed description without departing from the spirit of the invention.

I claim:

1. A car theft prevention device for locking a car key to a car exterior door handle that extends longitudinally of the car and comprising:
    a housing for being suspended from said handle and having a horizontal cross section that is elongated in the longitudinal direction of said handle and formed with a key-receiving chamber having an opening and leg-receiving passages disposed on opposite sides of said opening;
    a cover disposed in telescopical relationship with said housing for closing said opening and including a pair of leg-receiving openings, said cover being shiftable on said housing between an open and an uncovering position;
    a U-shaped shackle formed with a pair of spaced apart legs for receipt in said shackle-receiving passages and which bend inwardly at their upper extremity to define downwardly facing retaining shoulders for engaging said cover to limit cover movement in one direction on said legs, said legs being connected together by a central loop for receipt over said door handle, said loop being twisted to form a turned portion extending generally transversely to the plane of said legs for resting on said handle so said housing, when suspended from said handle, will extend generally longitudinally of said handle, one of said legs being sufficiently longer than the other to enable said cover to be telescoped off said housing sufficiently to clear said opening sufficiently to enable said car key to be removed from said chamber while at least said one leg remains engaged with said housing; and
    locking means mounted in said housing for locking one of said legs to said housing to retain said cover in a covering position over said chamber whereby said key may be placed in said chamber, said cover telescoped onto said housing, said shackle looped over said handle, said locking means locked to lock said shackle to said housing to hold said cover in position on said housing to retain said key locked on the door and when said key is to be removed from said chamber said locking means may be unlocked, and said cover telescoped off said housing to clear said opening sufficiently to enable said key to be removed while said one leg remains engaged with its leg-receiving passage.

2. A car theft prevention device as set forth in claim 1 wherein:
    said key-receiving chamber is open on one side; and
    said cover is box-shaped and formed with an open bottom to be telescoped over the top end of said housing and terminating in a bottom end that clears a sufficient portion of said opening while said one leg is still engaged with said housing to enable said key to be removed from said chamber.

3. A car theft prevention device as set forth in claim 1 wherein:
    said cover is formed from a tough metal and is coated with a cushioning plastic for protecting the finish of said car from said device.

4. A car theft prevention device as set forth in claim 1 wherein:
    said housing is coded with a bright color to give warning that a car having said device hanging from the door handle thereof is being operated by an unauthorized individual.

5. A car theft prevention device as set forth in claim 1 wherein:
    said cove is made of a tough zinc alloy and is coated with a fluorescent plastic.

* * * * *